UNITED STATES PATENT OFFICE.

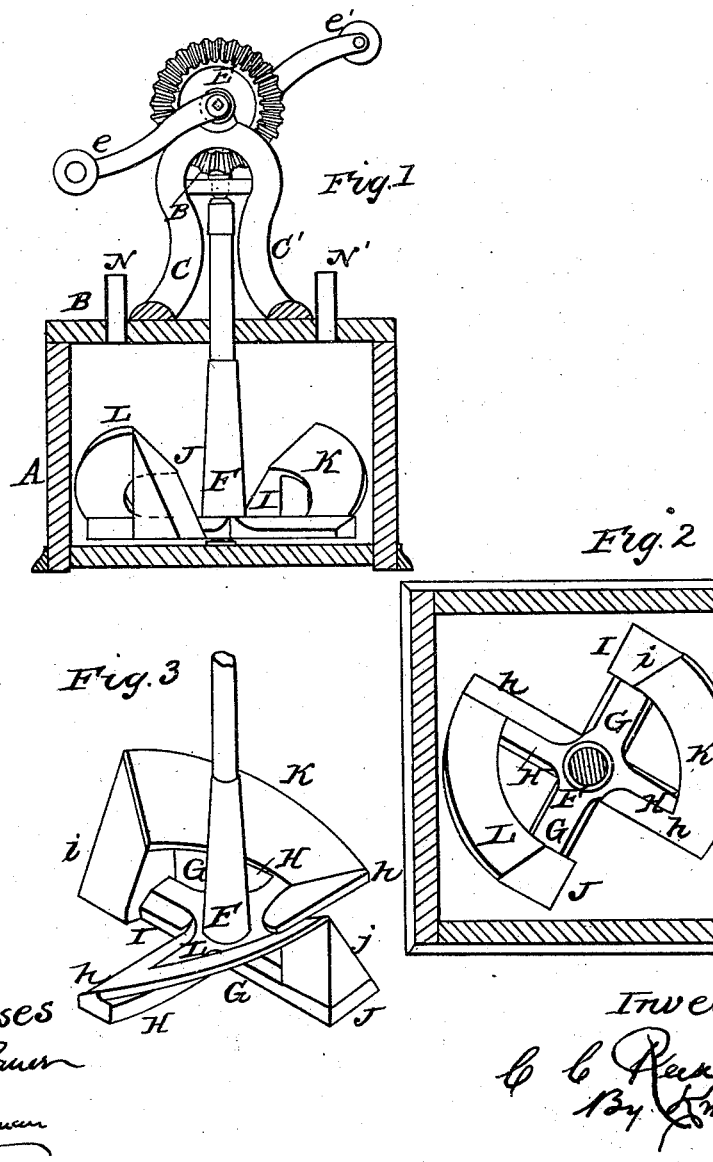

CHRISTIAN C. REESE, OF ATTICA, INDIANA.

IMPROVEMENT IN CHURNS.

Specification forming part of Letters Patent No. 79,002, dated June 16, 1868.

*To all whom it may concern:*

Be it known that I, CHRISTIAN C. REESE, of Attica, in the county of Fountain and State of Indiana, have invented certain new and useful Improvements in Churns; and do hereby declare the following to be a full, clear, and exact description thereof, reference being had to the accompanying drawings, making part of this specification.

My invention relates more particularly to the shape of the dasher, which is formed in such a manner that when rotated in one direction it will produce the most thorough and complete agitation of the cream, and when rotated in the opposite direction it serves to gather the butter.

In the accompanying drawings, Figure 1 is a vertical section of a churn provided with my improved dasher. Fig. 2 is a horizontal section of the same, and Fig. 3 is a perspective view of the dasher detached.

The cream-chamber A is a rectangular vessel, closed by a lid, B, to which are secured standards C C', that afford journal-bearings for the pinion D and spur-wheel E, the latter being rotated by the winches e e'. The pinion D is attached to a vertical shaft, F, whose lower end is provided with radial arms G H, which carry the dashers and gatherers.

The dashers I and J, which are attached to the two opposite ends of the arm G, are provided with inclined faces i j, which serve to throw the cream outwardly and upwardly when the shaft E is rotated in the proper direction.

The gatherers consist of curved and inwardly-inclined boards or plates K L, which extend from the top of the dashers down to the ends of the arms H; and said arms are chamfered at h h', so as to coincide with the angle of the gatherers.

N N' are tubes in the lid B, for the admission of air to the cream-chamber.

The operation of my dasher is as follows:

In churning, the shaft is rotated in the direction indicated by the arrow in Fig. 2; and it will be seen that this brings the inclined faces i j of the dashers in direct contact with the cream, and the rapid rotation of said dashers causes the cream to be thrown violently upward against the sides and angles of chamber A, from which it falls back to the bottom of said chamber through the openings between the arms and gatherers, thereby producing the most thorough agitation; and as the chamber is rectangular, there is no opportunity for the cream to be carried around in a continuous current, as would be done if the vessel were cylindrical.

The arms G H assist very materially in increasing the agitation; and as they revolve near the bottom of the cream-chamber, it will be seen that the entire body of cream, from top to bottom, is continually in motion, and, as a natural result, a superior quality of butter is produced in a very few minutes.

After the butter has been formed, it is gathered by rotating the dashers in an opposite direction to that of churning, as shown by the arrow in Fig. 2, which act causes the butter to collect on the arms G H and gatherers K L, from which it can be readily removed.

I claim herein as new and of my invention—

1. A churn-dasher consisting of the vertical shaft F, radial arms G H, dashers I i J j, and gatherers K L, the whole being arranged and operating substantially as herein described and set forth.

2. In combination with the elements F, G, H, I, i, J, j, K, and L of the preceding clause, the pinion D, spur-wheel E, and winches e e', for the purpose specified.

In testimony of which invention I hereunto set my hand.

CHRISTIAN C. REESE.

Witnesses:
GEO. H. KNIGHT,
JAMES H. LAYMAN.